May 25, 1943.  C. T. WALTER  2,319,908
CONTAINER FILLING AND WEIGHING APPARATUS
Filed Dec. 6, 1940  4 Sheets-Sheet 1
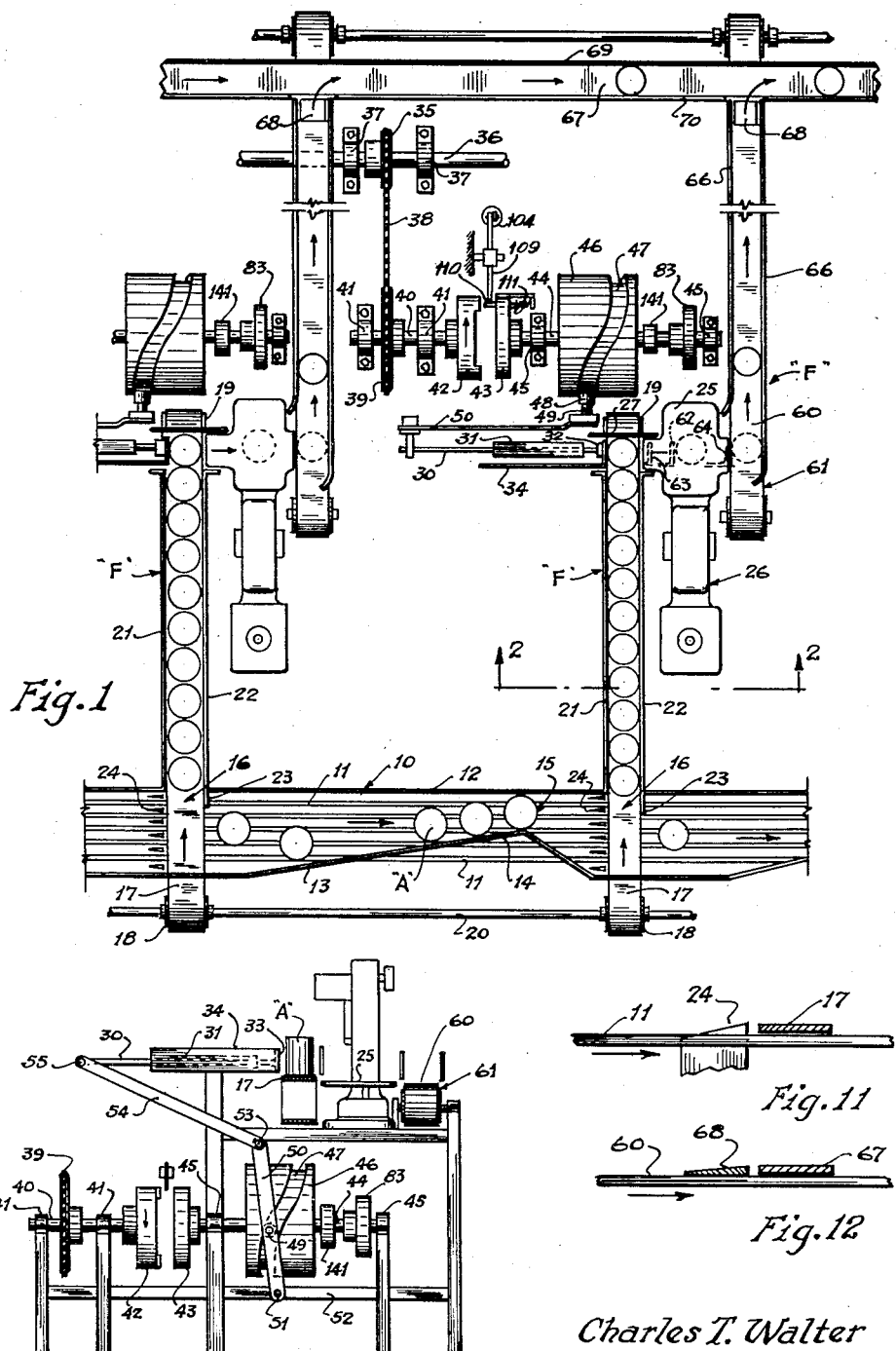
Charles T. Walter
INVENTOR
BY R H Story
ATTORNEY

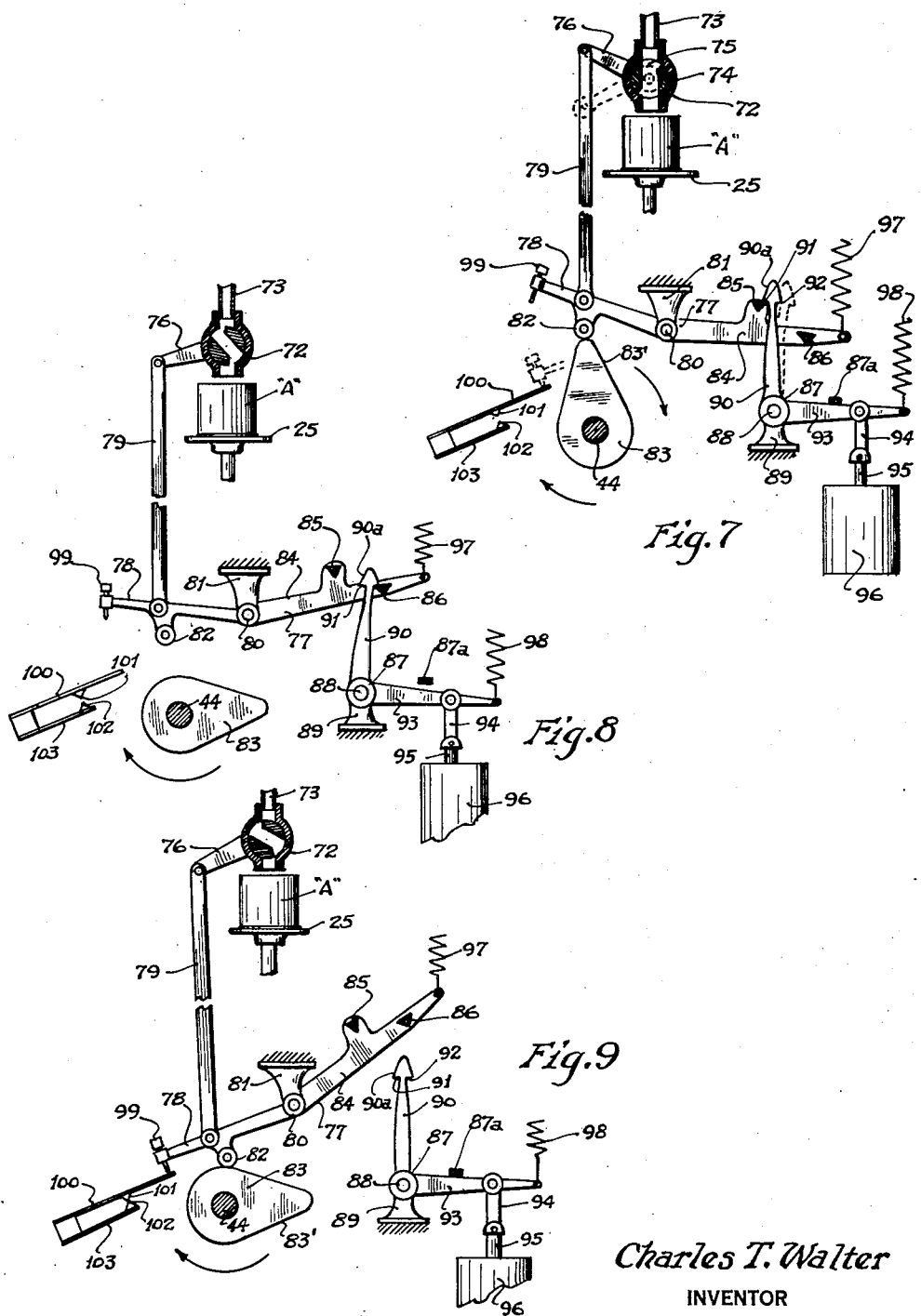

May 25, 1943.   C. T. WALTER   2,319,908
CONTAINER FILLING AND WEIGHING APPARATUS
Filed Dec. 6, 1940   4 Sheets-Sheet 4

ATTEST-

Charles T. Walter
INVENTOR

BY
ATTORNEY

Patented May 25, 1943

2,319,908

UNITED STATES PATENT OFFICE 2,319,908

CONTAINER FILLING AND WEIGHING APPARATUS

Charles T. Walter, Chicago, Ill., assignor to Industrial Patents Corporation, Chicago, Ill., a corporation of Delaware Application December 6, 1940, Serial No. 368,881

4 Claims. (Cl. 249—59)

This invention relates to machines for filling containers, and more particularly to machines adapted to fill cotainers with a desired weight of a liquid substance.

It has been common heretofore to fill containers with liquid by volumetric metering means. Machines of this character are fairly satisfactory and have come into fairly wide use because they are relatively simple in construction and have a reasonably high production rate. However, these machines have the great disadvantage in that there is an appreciable variation in the weight of the metered charges introduced into the containers; some being greater, and others less, than a desired weight. If the charge is underweight, the container or package is void for commercial purposes. The underweight factor may be alleviated to some extent by adjusting the volume delivery of the machine so that the average weight of the charge of material introduced into the container is a safe margin over the minimum desired weight. This margin or "overage" may be as high as one-eighth of an ounce for one pound packages. While an overweight package is commercially acceptable, the "overage" constitutes a direct and unnecessary loss. Occasional checking of the net weight of the containers enables the operator to keep the machine fairly well adjusted so that few underweight containers are delivered. However, it is impossible to consistently fill containers with an exact weight of material by the use of known volumetric filling apparatus. In all such apparatus, the factor of "overage" is appreciable and there is, therefore, an urgent need for filling machinery which will introduce liquid substances into containers with accurate weighing, to thereby save the excess weight or overage generally accepted as a necessary and inherent loss in volumetric equipment to safeguard against underweight packages.

Accordingly, one of the principal objects of the invention is to provide a filling machine which will eliminate the loss, and thus effect a saving of the great mass of material usually lost as "overage" in volumetric filling machines.

Another important object of the invention is to provide a filling machine capable of filling containers with precise, weighed quantities of liquid materials or products.

Still another object of the invention is to provide a container filling machine which will fill containers by gravity flow of material, thereby eliminating the use of the metering pump employed in conventional volumetric filling machines.

A further object of the invention is to provide a filling and weighing machine that will work automatically, accurately and with a high production rate.

A further object of the invention is to provide a filling and weighing machine which can produce any maximum capacity desired simply by the installation of the necessary number of units in the machine, and which can be operated at a reduced capacity by using only a certain number of the units constituting the machine.

A still further object of the invention is to provide a container filling machine capable of accurately weighing lard and other products in a liquid condition as said products are deposited into containers.

Other and further objects and advantages of the invention will be apparent from the disclosure.

In general, a machine constructed in accordance with the present invention may consist of a single filling and weighing unit or a number of such units arranged in parallel relationship. Any number of units may be employed, depending upon the maximum production capacity desired.

When a plurality of units is used, a main conveyor is preferably employed to feed empty containers to the several units. The empty containers are then diverted from the main conveyor onto individual feed conveyors for the respective units. A container transfer mechanism, driven through a one-revolution clutch, is arranged to move an empty container from a unit feed conveyor onto a weighing platform of a scale to a position directly under a feed valve. A feed valve opening and latching mechanism, also driven through said one-revolution clutch, is operated to initially place the feed valve in full open position and to latch it in such position.

A photoelectric cell connected with a relay is associated with an oscillatable scale pointer having a laterally extending vane or blade. The photoelectric cell is arranged to control the closing movements of the feed valve, to wit, as the contents of the container approach the desired weight, the leading edge of the vane on the pointer intercepts the light beam, whereupon the relay closes a circuit to a solenoid for releasing the feed valve from its full open latched position, allowing movement of said valve by a control lever and spring to a partly open position. The feed valve is automatically latched in its partly open position so that the flow of material to the container then continues, but at a greatly reduced rate. The period of reduced flow is determined by the length of time that the solenoid remains energized, and this, in turn, is dependent upon the length of the lateral vane on the pointer, or, stated another way, the duration of the time interval that the light beam is intercepted by said vane. The arrangement is such that, as the trailing edge of the vane is moved out of the path of the light beam, the exact desired weight of material will have been deposited in the container; the light beam of the photoelectric device is then no longer interrupted and the solenoid is immediately deenergized to unlatch the feed valve from its partly open position and allow the same to be instantly moved to a fully closed position by the control lever and spring previously referred to. As the feed valve is returned to its fully closed position, a member carried by the control lever completes a circuit to a second solenoid controlling the one-revolution clutch. This second solenoid releases a detent for engagement with the driving element of the one-revolution clutch. The engagement of the one-revolution clutch imparts a drive to the container transfer mechanism so that the filled and weighed container is now shoved off the weighing platform of the scale and onto a discharge conveyor for the particular unit. The transfer mechanism then returns to a position where it engages an empty container, shifts said container onto the weighing platform of the scale as previously described, and then recedes from said container to a position of rest. This cycle is repeated indefinitely.

The filled container is carried by the unit discharge conveyor to a main discharge conveyor which receives filled containers from all of the units comprising the machine. The various conveyors, transfer mechanism and feed valve mechanism of the several units, as well as the main feed and discharge conveyors, may be driven from a common drive shaft, if desired. Obviously, one unit or several units may be operated at a time.

Referring to the drawings:

Figure 1 is a diagrammatic plan view of a machine constructed in accordance with the principles of the present invention, illustrating the manner in which a plurality of filling and weighing units may be supplied with empty containers by a main feed conveyor and the filled containers carried away from the several units by a main discharge conveyor;

Figure 2 is a sectional view taken on the line 2—2 of Figure 1, diagrammatically illustrating the mechanism for transferring empty containers onto the scale from a moving unit feed conveyor and for pushing filled containers from the scale onto a moving unit discharge conveyor;

Figure 5:
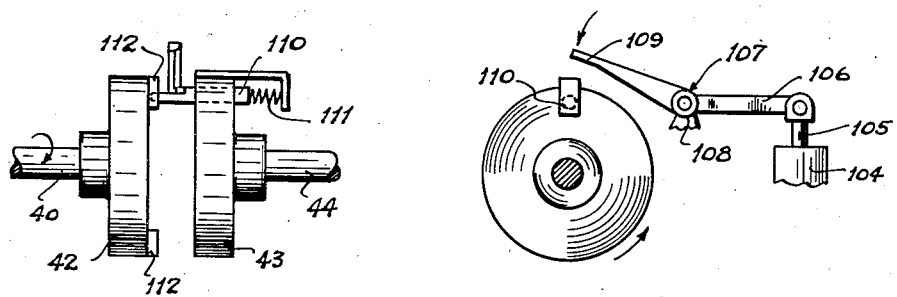
Figure 6:
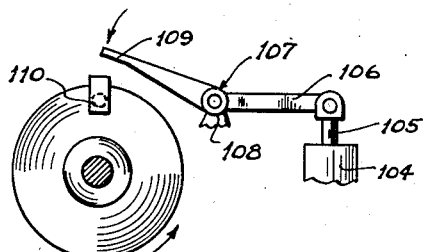
Figure 10:
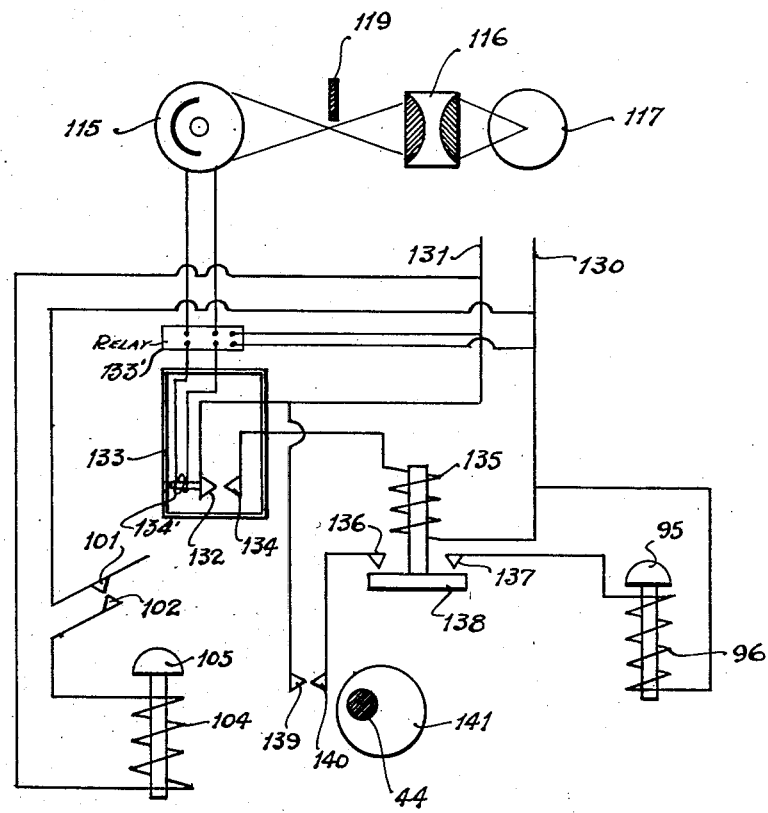

Figures 5 and 6 diagrammatically illustrate the details of a solenoid-controlled one-revolution clutch for driving the container transfer mechanism and for actuating the feed valve opening and latching mechanism to position and holding the feed valve in its initial, wide open position;

Figure 7 is a diagrammatic view of the feed valve actuating mechanism showing the operating cam in position for effecting opening of the feed valve and latching of said feed valve in its wide open position;

Figure 8 is a view similar to Figure 7 but showing the cam in its rest position and the feed valve latched in a partly open position at which time the rate of flow therethrough to a container is materially reduced;

Figure 9 is a further view of the feed valve actuating mechanism showing the feed valve in its fully closed position and the feed valve control lever positioned to complete the circuit to the solenoid controlling the one-revolution clutch;

Figure 10 is a wiring diagram showing the circuit for one filling and weighing unit of the machine;

Figure 11 is a diagrammatic view illustrating the wedge for elevating the empty containers from the main feed conveyor onto the unit feed conveyor belt; and Figure 12 diagrammatically illustrates a means which may be employed for elevating filled containers from a unit discharge conveyor belt onto the main discharge conveyor belt.

Referring now to Figure 1 of the drawings, the main feed conveyor 10 comprises a series of parallel continuously moving chains 11 extending the entire length of the machine and arranged to supply empty containers to the several filling and weighing units F, F. A fixed guide rail 12 is positioned above the chains 11 at one side of the conveyor 10 and extends between adjacent units F. A second fixed guide rail 13 is arranged opposite the guide rail 12 and includes an agularly disposed portion 14 inclined toward the guide rail 12 to form a restricted throat at 15 wide enough for the passage therethrough of only one container at a time.

Individual unit feed conveyors 16 comprise endless cross feed belts 17 running over a drive pulley 18 and an idler pulley 19. The drive pulleys 18 are preferably mounted upon a common drive shaft 20. Parallel guides 21 and 22 are disposed adjacent the opposite edges of the respective belts 17. It will be noted from Figure 1 that the guide 22 includes an end portion 23 which projects over the main feed conveyor 10. The purpose of the portion 23 will be explained hereinafter.

An inclined wedge 24 (see Figures 1 and 11) is disposed between each two adjacent chains 11 and alongside one edge of the upper run of the conveyor belt 17. The upper surface of these wedges slopes gently from a level below that of the chains 11 to a level slightly above the top surface of the upper run of the conveyor belt 17. The feed conveyors 10 and 16 operate continuously and the speed and capacity of the main feed conveyor 10 is preferably such that it will supply enough empty containers to keep all of the belts 17 of the individual feed conveyors 16 full. The apparatus is designed primarily for handling round cans, but obviously the particular shape of the can or size is not critical and the apparatus may be readily constructed to handle cans other than round cans as well as cans of various size.

In operation, the main feed conveyor 10 is loaded automatically or manually, as desired, with a number of empty cans or containers A. These cans or containers are carried along by the chains 11, and those cans or containers which are remote from the guide 12 will be directed toward said guide by the angularly disposed portion 14 of the guide 13 and into the throat portion 15. Upon encountering the wedges 24, the containers will be elevated onto the upper run of the cross feed conveyor belts 17, which will then carry the same forward to be filled and weighed. The extended portion 23 of the guide 22 serves as a stop, enabling any container restrained thereby to be carried along by the belt 17. If the belt 17 is fully loaded, as indicated in Figure 1, then empty containers will be pushed or diverted by the succeeding containers, around the container abutting the stop portion 23, and back onto the main feed conveyor chains 11 to be carried to the next unit or units.

Figure 1 of the drawings illustrates the filling units in that portion of their cycle of operation at which an empty container is about to be transferred laterally from the feed belt 17 onto the weighing platform 25 of a scale 26. As shown, the foremost empty container is in abutting engagement with a stop member 27. It will be understood that the stop 27 restrains the forward travel of the empty containers while the conveyor belt 17 continues to travel and slide under the containers carried thereby.

The mechanism for transferring the containers laterally from the feed belt 17 is best shown in Figure 2 and comprises a rod 30 which is slidably mounted in a fixed guide 31. One end 32 of the rod 30 is suitably connected with a pusher plate 33 which, as shown, is spaced slightly from the foremost empty container on the belt 17 and is about to move forward to push the same off said belt onto the weighing platform 25.

The rod 30 is reciprocated by the drive mechanism illustrated diagrammatically in Figures 1 and 2. Here, a sprocket 35 is shown mounted upon a drive shaft 36 supported in suitable bearings 37. A sprocket chain 38 transfers the drive from the sprocket 35 to a sprocket 39 on a continuously driven shaft 40. The shaft 40 is mounted in suitable bearings 41. The driving element 42 of a one-revolution clutch is mounted upon one end of the shaft 40. The driven element 43 of the one-revolution clutch is mounted upon an intermittently driven shaft 44 supported in bearings 45. The elements 42 and 43 of the one-revolution clutch are adapted to be connected together for rotation in a manner, and at a given time in the cycle, as will be set forth more fully hereinafter.

The intermittently driven shaft 44 carries a cylindrical cam 46 provided with a cam groove 47. A roller 48 extends into the cam groove 47 and is mounted upon a pin 49 carried by a lever 50. One end of the lever 50 is pivotally connected at 51 to a member 52 forming a part of the framework of the machine. The opposite end of the lever 50 is connected at 53 to one end of a link 54 and the opposite end of said link is, in turn, pivotally connected at 55 to one end of the transfer rod 30.

It will thus be apparent from Figure 2 that, as the cam 46 is rotated, the rod 30 will be reciprocated in its guide 31 so that the pusher plate 33 will be actuated to transfer an empty container A from the feed belt 17 onto the weighing platform 25, and to thereafter transfer a filled container from said platform onto the belt 60 of a unit discharge conveyor 61.

The positions which the pusher plate 33 assumes during a complete cycle of operation of the filling unit are illustrated in dotted lines in Figure 1. The cam groove 47 is so designed that the pusher plate 33 will advance from its full line position to the dotted line position designated 62 to place an empty container in position for filling on the weighing platform 25. The pusher plate 33 will then be retracted to the position indicated at 63, which is the normal dwell position of said plate between cycles. It will be noted that, when the pusher plate 33 is in this position, a right angle extension 34 of said pusher plate extends across the feed belt 17 and serves as a stop for the empty containers on said belt. Assuming the container A has been filled and weighed, the one-revolution clutch 42—43 is engaged and the pusher plate 33 is then advanced to the position indicated at 64, thereby displacing said container from the weighing platform 25 onto the discharge belt 60. The pusher plate 33 is then retracted to the position presently shown in full lines, the extension 34 being thus moved out of the path of the feed conveyor 17 to permit the then foremost empty container to be advanced to the stop 27 and to be transferred onto the weighing platform 25 for filling as the pusher plate moves forward to 62 and then back to assume its dwell position 63. This cycle is repeated indefinitely.

Parallel guide rails 66 are disposed along the opposite edges of the discharge belt 60 to guide the filled containers onto a main discharge conveyor 67. A wedge 68 (see Figures 1 and 12), secured to the rails 66 and having a thin leading edge engaging the belt 60 and having a heel in a plane common to the top surface of the upper run of the main discharge conveyor 67, serves to elevate the filled containers from the unit discharge belt 60 onto the main discharge conveyor 67. Rails 69 and 70 guide the containers carried by the main discharge conveyor 67.

The mechanism for controlling the gravity flow of the material to be packed is diagrammatically illustrated in Figures 7, 8 and 9. As shown, an empty container A is resting upon the weighing platform 25 directly beneath a feed valve 72 which may be supported above the container by a supply pipe 73, or by any other suitable means. A suitable weight W is positioned upon the other platform 25a of the scale 26, the mass of said weight corresponding to the net weight of said container and its desired content.

The discharge end of the feed valve 72 is disposed as close to the plane of the upper rim of the container A as is practicable in order to assure accurate weighing by reducing the length of the stream between the feed valve and container to a minimum so that all flow to the container stops the instant that the feed valve 72 is closed.

The feed valve 72 contains a core 74 provided with a diametrical through port 75. Figure 7 illustrates the manner in which the core 74 of the feed valve is actuated to place the valve in wide open condition. All rotation of the valve core 74, from open to closed position, and vice versa, is effected by means including an arm 76 connected at one end in any suitable manner to said core exteriorly of said valve. The free end of the arm 76 is pivotally connected to an arm 78 of a feed valve control lever 77 by means of a link 79. The control lever 77 is pivotally mounted at 80 upon a fixed bracket 81. The arm 78 of the lever carries a roller 82 adapted to cooperate with a cam 83 mounted upon the aforementioned intermittently driven shaft 44. Another arm 84 of the lever 77 carries two stops 85 and 86, respectively. These stops may be formed triangular in cross section as shown. The stops 85 and 86 are adapted to cooperate with a solenoid controlled latching mechanism for first latching the valve 72 in a wide open position to rapidly admit material into the container, and later, as the weight of the contents of the container approach the desired weight, latching said valve in a partially open condition to restrict the rate of flow until the desired weight is reached. The feed valve is finally unlatched and closed completely when the desired weight is attained, as will be explained more fully hereinafter.

The feed valve latching mechanism comprises a bell crank 87 pivotally mounted at 88 upon a fixed bracket 89. One arm 90 of the bell crank 87 has its extremity shaped similar to an arrowhead and thus provides a cam surface 90a and latching abutments 91 and 92, respectively. The opposite arm 93 of the bell crank 87 is connected by a link 94 to the core 95 of a solenoid 96. The free end of the arm 84 of the valve control lever 77 is connected to a tension spring 97, and the free end of the arm 93 of the bell crank 87 is connected to a tension spring 98, both of which springs are arranged to continuously exert an upward pull.

An adjustable member 99 is carried at the free end of the arm 78 of the valve control lever 77 and is adapted to be brought into engagement with a yieldable strip 100 carrying a contact 101, as shown in Figure 9. A cooperating contact 102 is carried by a strip 103. The engagement of these contacts completes a circuit to a solenoid 104 which, when energized, permits engagement of the one-revolution clutch 42—43 for driving the transfer mechanism previously described, and for opening the feed valve 72 to its initial full open position, after the pusher plate 33 has come to rest. The opening of the feed valve 72 and the latching thereof in its open position occurs as follows:

Referring to Figure 9, the core 95 of the solenoid 96 is shown in the position it assumes when the solenoid is deenergized. The spring 98 will, of course, be exerting an upward pull on the arm 93 of the bell crank 87, holding it against the stop 87a. As the cam 83 is rotated, the roller 82 is engaged by the cam lobe 83' and raised upwardly relative to the fixed bracket 81. Upward movement of the roller 82 causes the valve control lever 77 to fulcrum on the pivot 80 carried by the bracket 81 so that the arm 84 of said lever is moved downwardly, causing the stop 85 to engage the cam surface 90a on the end of the arm 90 of the bell crank 87 and thereby rock the arm 90 clockwise. Such rocking causes the bell crank 87 to turn about its pivot 88 against the action of the spring 98. Once the stop 85 has been moved to a position below the abutment 91, the spring 98 will cause the bell crank 87 to return, thereby bringing the latching abutment 91 to a position overlying the stop 85, as shown in Figure 7. Hence, even though the cam 83 continues to rotate to a dwell position such as shown in Figures 8 and 9, the feed valve 72 remains open because of retention of the control lever 77 in latched position by the bell crank 87.

So long as the solenoid 96 is deenergized, material will flow through the valve 72 into the container A at a maximum rate. However, when the solenoid 96 is energized by the photo-relay device described hereinafter, it immediately turns the bell crank 87 about its pivot 88, pulling the arm 93 downwardly against the action of the spring 98, momentarily releasing the control lever 77 from the arm 90. The arm 90 is thus moved clockwise to a position where the abutment 92 thereof is engaged by the stop 86 on the control lever 77, as shown in Figure 8. The movement of the bell crank 87 is substantially instantaneous, so that the abutment 92 is in position to engage the stop 86 and latch the lever 77 before the spring 97 can possibly raise the stop 86 to such a height that the abutment 92 would fail to engage the same. Moreover, the spring 97, in pulling upwardly on the arm 84 of the valve control lever 77, produces a downward pull on the valve arm 76 through the link 79, thereby moving the valve core 74 from the wide open position shown in Figure 7. The solenoid 96 remains energized until the desired weight of material has been deposited in the container A, whereupon it is deenergized by the photo-relay control, as explained hereinafter, and the bell crank arm 93 is then returned to its initial position abutting the stop 87a by the spring 98, at the same time releasing the control lever 77 so that the spring 97 can move said lever and the valve core 74 connected therewith to its fully closed position shown in Figure 9. The return of the control lever 77 to the position corresponding to the fully closed position of the feed valve 72, of course, causes the cam roller 82 to drop onto the low part of the cam 83, as shown. During the course of this movement, the member 99 carried by the lever arm 78 strikes against the contact strip 100 and engages the contact 101 with the contact 102. The engagement of these contacts completes a circuit to the solenoid 104 controlling the starting or trip mechanism of the one-revolution clutch 42—43.

The trip mechanism of the one-revolution clutch is diagrammatically illustrated in Figures 5 and 6. Here, the solenoid 104 has the core 105 thereof connected to one end 106 of a lever 107 rockably mounted upon a fixed pivot 108. The opposite end of the lever 107 is formed into a cam finger 109 which lies in the path of a detent 110 carried by the driven clutch element 43 when the solenoid 104 is deenergized. The detent 110 is continuously urged toward the driving clutch element 42 by a compression spring 111. The driving clutch element 42 carries lugs 112 respectively capable of driving engagement with the detent 110.

If it is assumed that the circuit to the solenoid 104 is completed, through the engagement of contacts 101 and 102 (see Figure 9), said solenoid will be energized and the detent 110 will be released through raising of the cam finger 109. The detent 110 then advances toward the driving clutch element 42, under the influence of the compression spring 111, to be engaged by one of the lugs 112. The driving engagement of these parts of the one-revolution clutch necessarily imparts a drive to the shaft 44 carrying the container transfer mechanism cam 46 and the feed valve cam 83.

When the solenoid 104 is deenergized, as when the cam 83 rotates to a position such as to raise the member 99 from the contact strip 100, the cam finger 109 drops into position to engage the detent 110, while the clutch is rotating toward said finger, to withdraw said detent from contact with the lug 112 and thereby effect disengagement of the clutch at the completion of the revolution.

Figure 3:
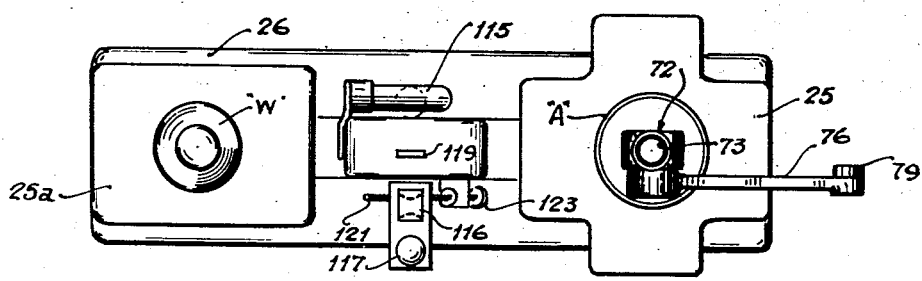
Figure 3 is an enlarged plan view of one of the scales, diagrammatically illustrating the arrangement of the photoelectric control means with respect to the scale pointer.
Figure 4:
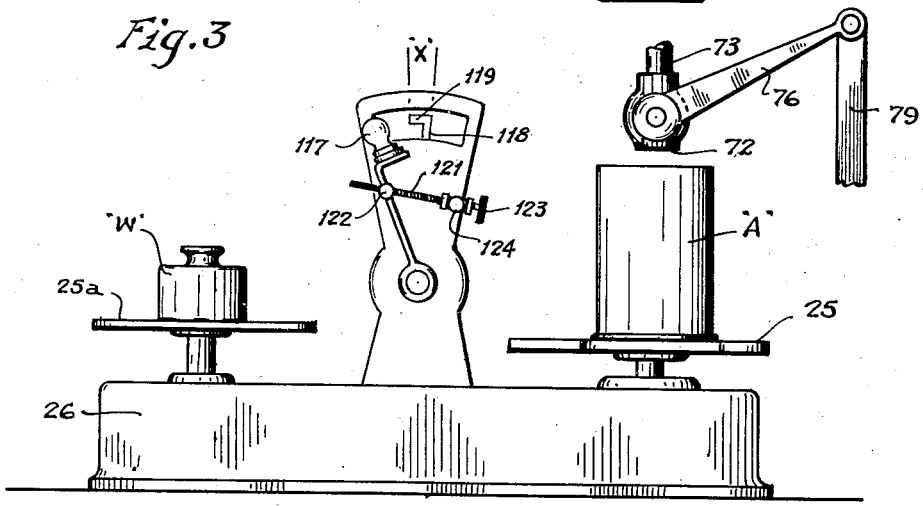
Figure 4 is an elevational view of the scale shown in Figure 3, but with the right source and lens of the control means shifted to one side to reveal the vane or blade on the scale pointer.

The photoelectric control device previously referred to herein for effecting partial closing and complete closing, respectively, of the valve 72 by manipulation of the latching mechanism, is diagrammatically illustrated in Figures 3, 4 and 10. Here, a light-sensitive, or photoelectric, tube 115 is shown associated with a lens system 116 and light source 117. The light source and lens system is located on one side of the plane of travel of a scale pointer 118 and the photoelectric tube 115 is located upon the opposite side of said plane.

The scale pointer 118 carries a vane 119, the arcuate length of which is indicated by the dimension X in Figure 4. The relative mounting for the photoelectric tube 115 and the light source 117 on the scale 26 is such that a beam of light passing from the light source to the tube extends across the path of travel of the vane 119. The light source 117 and lens system 116 are preferably adjustably mounted on the scale 26 so that they may be moved along the arc traversed by the vane 119 to provide for accurate weighing by close control of the reduced flow and cut-off of the feed valve 72.

An adjusting means for the photoelectric control is diagrammatically illustrated in Figures 3 and 4, wherein a screw 121 and a swivel nut 122 provide a micrometer adjustment for locating the light source 117 and lens system 116 with respect to the vane 119. One end of the screw 121 is provided with a knurled knob 123 to facilitate adjustment, the screw itself being rotatably mounted in a fitting 124.

By a careful selection of the type of light source and lens system, a very narrow but intense beam of light may be focussed at the plane of motion of the vane 119. With an appropriately designed optical system, a movement of the vane 119 of only .010 inch is sufficient to open and close the circuit controlled by the photoelectric tube 115.

An electric circuit that may be employed to effect automatic operation of the filling and weighing machine disclosed herein is diagrammatically shown in Figure 10. This circuit is suitable for one of the filling units comprising the machine and it will be understood that the remaining units may be similarly wired.

The circuit comprises two main power lines 130 and 131. The line 131 is connected with a contact member 132 located in a box 133. A second contact member 134 is also located in the box 133. As illustrated, the contact member 132 is normally spaced from the contact member 134. This condition prevails when the photoelectric tube 115 is brightly illuminated by a beam from the light source 117. However, when the light beam is interrupted by the vane 119 the contact members 132 and 134 become engaged, in a manner well understood, the relay device 133' actuates the solenoid 134' to effect the closing of the contact members.

The contact member 134 is connected with one end of a relay coil 135 and the opposite end of said coil is connected with the power line 130. The relay circuit includes contact elements 136 and 137; whereby, when the relay armature 138 is actuated, an electrical connection is effected between these contacts. The contact 137 is connected to one terminal of the solenoid 96, and the power line 130 is connected to the other terminal of said solenoid. Two additional contacts 139 and 140 are connected in this portion of the circuit to maintain the circuit open to prevent inadvertent operation of the feed valve latching bell crank 87 by oscillation of the vane 119 during the time that the containers are being transferred and until the weighing platform 25 comes to rest, ready for another weighing operation. Engagement of the contacts 139 and 140 is effected by a suitable cam 141 mounted on the driven shaft 44. These latter contacts are preferably engaged after the feed valve 72 has been opened wide by the cam 83 and latched in such position by the bell crank 87, in the manner previously described.

Figure 10 also illustrates the manner in which the contacts 101 and 102 for controlling the solenoid 104 of the one-revolution clutch are connected with said solenoid and the power lines 130 and 131.

In operation, with the feed valve 72 open, liquid material will rapidly flow from said valve into an empty container A. As the contents of the container approach the desired weight, the leading edge of the vane 119 will move in a plane between the light source 117 and the photoelectric tube 115, interrupting the light beam acting upon said tube. The interruption of the light beam causes the contacts 132 and 134 to engage and actuate the relay armature 138, as previously indicated. The armature 138 bridges the contacts 136 and 137, and with the contacts 139 and 140 held in engagement by the cam 141, the circuit to the solenoid 96 is completed.

Energization of the solenoid 96 operates the bell crank 87 of the feed valve latching mechanism. That is to say, the solenoid 96 pulls the arm 93 of the bell crank 87 downwardly, causing the other arm 90 of said bell crank to turn clockwise, momentarily releasing the valve control lever 77 from the latching abutment 91. The tension spring 97 attached to the control lever 77 then causes said lever to turn upon its pivot 80, causing the valve core 74 to be turned through the link 79 and arm 76 toward closed position. However, the turning of the bell crank 87 by the solenoid 96 is substantially instantaneous so that the abutment 92 on the crank arm 90 is in position to engage the stop 86 as the lever 77 turns on its pivot, thus latching said lever in position with the feed valve 72 partly open, as shown in Figure 8. Flow then continues to the container through the feed valve, but at a greatly reduced rate, until the trailing edge of the vane 119 passes out of the path of the light beam. At such instant, the photoelectric tube 115 is re-illuminated and the contacts 132 and 134 associated with said photoelectric tube separate, interrupting the circuit to the relay coil 135. Deenergization of the relay coil 135 releases the relay armature 138 and the circuit to the solenoid 96 is interrupted at the contacts 136 and 137. The solenoid 96 is then deenergized, releasing the bell crank 87 so that the tension spring 98 turns said bell crank counterclockwise, thereby again unlatching the valve control lever 77. Upon release of said control lever the tension spring 97 pulls the adjacent end thereof upwardly still further, effecting a complete closing of the feed valve 72 and bringing the roller 82 into engagement with the cam 83, as shown in Figure 9. Simultaneously, the member 99 on the control lever 77 closes the contacts 101 and 102 energizing the solenoid 104 for effecting engagement of the one-revolution clutch 42—43, and the consequent operation of the container transfer mechanism and opening of the feed valve, as previously described.

It will be understood that, subsequent to the closing of the feed valve 72, the cam 141 assumes a position such that the contacts 139 and 140 are separated, effecting a break in the circuit of the latch operating solenoid 96. Hence, upon the return movement of the vane 119, or upon any oscillatory movement thereof following the displacement of a filled container from the scale platform 25, the solenoid 96 cannot be operated even though the relay armature 138 may be operated as the result of interruption of the light beam by the said vane 119. It will be further understood that the cam 141 again engages the contacts 139 and 140 after an empty container has been positioned upon the scale and the feed valve 72 has been placed in open latched position by the cam 83 for another weighing operation.

The adjusting screw 121 associated with the photoelectric cell 115 can be set in such position that it will cause the feed valve 72 to close at the exact point desired so that no excess material will be fed to a container. Thus, the containers can be filled with the exact weight of material required and the necessity for "overage" incidental to volumetric filling is eliminated.

It will be understood that the structure described herein is purely by way of illustration and not by way of limitation and that departures therefrom may be made without departing from the spirit of the invention.

I claim:

1. A container weighing and filling machine comprising: a scale having a weighing platform and a movable pointer, provided with a vane; a feed conveyor adjacent one side of said platform; a discharge conveyor adjacent the other side of said platform; a transfer mechanism for moving an empty container from said feed conveyor onto said weighing platform and for moving a filled container from said platform onto said discharge conveyor; a feed valve for admitting material into said empty container; mechanical means for opening said feed valve; drive means for said transfer mechanism and said feed valve opening means including a one-revolution clutch; control means for said feed valve; and means to actuate said control means including an electrical circuit, a photoelectric cell carried by said scale on one side of the plane of movement of said pointer vane, and a lens and a light source carried by said scale on the opposite side of said plane of travel of said pointer vane for directing a light beam on said photoelectric cell; a solenoid in said circuit arranged to actuate the control means to reduce the flow through said feed valve when the leading edge of said vane interrupts the light beam and to completely close said feed valve when the trailing edge of said vane moves out of the path of said light beam; and a second solenoid in circuit with said control means for effecting engagement of said one-revolution clutch after said feed valve is closed.

2. A container weighing and filling machine comprising: a scale having a weighing platform and a movable pointer, provided with a vane; a feed conveyor adjacent one side of said platform; a discharge conveyor adjacent the other side of said platform; a transfer mechanism for moving an empty container from said feed conveyor onto said weighing platform and for moving a filled container from said platform onto said discharge conveyor; a feed valve for admitting material into said empty container; mechanical means for opening said feed valve; drive means for said transfer mechanism and said feed valve opening means including a one-revolution clutch; control means for said feed valve; and means to actuate said control means including an electrical circuit, a photoelectric cell carried by said scale on one side of the plane of movement of said pointer vane, and a lens and a light source carried by said scale on the opposite side of said plane of travel of said pointer vane for directing a light beam on said photoelectric cell, said lens and light source being adjustable along the path of movement of said vane; a solenoid in said circuit arranged to actuate the control means to reduce the flow through said feed valve when the leading edge of said vane interrupts the light beam and to completely close said feed valve when the trailing edge of said vane moves out of the path of said light beam; and a second solenoid in circuit with said control means for effecting engagement of said one-revolution clutch after said feed valve is closed.

3. A container weighing and filling machine comprising: a scale having a weighing platform and a movable pointer, provided with a vane; a feed conveyor adjacent one side of said platform; a discharge conveyor adjacent the other side of said platform; a transfer mechanism for moving an empty container from said feed conveyor onto said weighing platform and for moving a filled container from said platform onto said discharge conveyor; a feed valve for admitting material into said empty container; mechanical means for opening said feed valve; drive means for said transfer mechanism and said feed valve opening means including a one-revolution clutch; control means for said feed valve; and means to actuate said control means including an electrical circuit, a photoelectric cell carried by said scale on one side of the plane of movement of said pointer vane, and a lens and a light source carried by said scale on the opposite side of said plane of travel of said pointer vane for directing a light beam on said photoelectric cell; a solenoid in said circuit arranged to actuate the control means to reduce the flow through said feed valve when the leading edge of said vane interrupts the light beam and to completely close said feed valve when the trailing edge of said vane moves out of the path of said light beam; a second solenoid in circuit with said control means for effecting engagement of said one-revolution clutch after said feed valve is closed; and a switch and solenoid in said circuit to control the flow of current to said first named solenoid, means driven from said clutch to close said switch when the clutch is not engaged and for opening the switch when it is engaged, said last named solenoid being controlled by said photoelectric cell, and said switch and last named solenoid permitting actuation of said control means by said first named solenoid only after said transfer mechanism has completed its cycle.

4. A machine for filling and weighing a container comprising a scale having a weighing platform to receive the container, a feed valve over said platform, means for operating said valve including a lever normally urged in a direction to close the valve, means to drive the lever in the opposite direction, latching means for holding said lever against movement in said first direction, stops on said lever disposed in offset relation, means on opposite sides of said latching means to engage said stops, said latching means being mounted between said stops and normally biased to engage one of said stops to hold the valve wide open, means controlled by said scale to drive said latching means in the direction opposite to that in which it is biased to release said engaged stop and to engage the other stop, said lever rotating upon the release of said one stop until said second stop is engaged by said latching means whereby the valve is turned to a partially closed position, and said latching means releasing said last named stop when said controlled drive means is de-energized whereby the lever is released entirely and rotates to close the valve, said controlled means being thus operative to effect a partial closing of the valve as the desired weight is approached and to close the valve entirely when the desired weight is attained.

CHARLES T. WALTER.